A. C. SCHULZ.
REMOVABLE BODY FOR VEHICLES.
APPLICATION FILED DEC. 27, 1913.
1,243,636.
Patented Oct. 16, 1917.
4 SHEETS—SHEET 1.
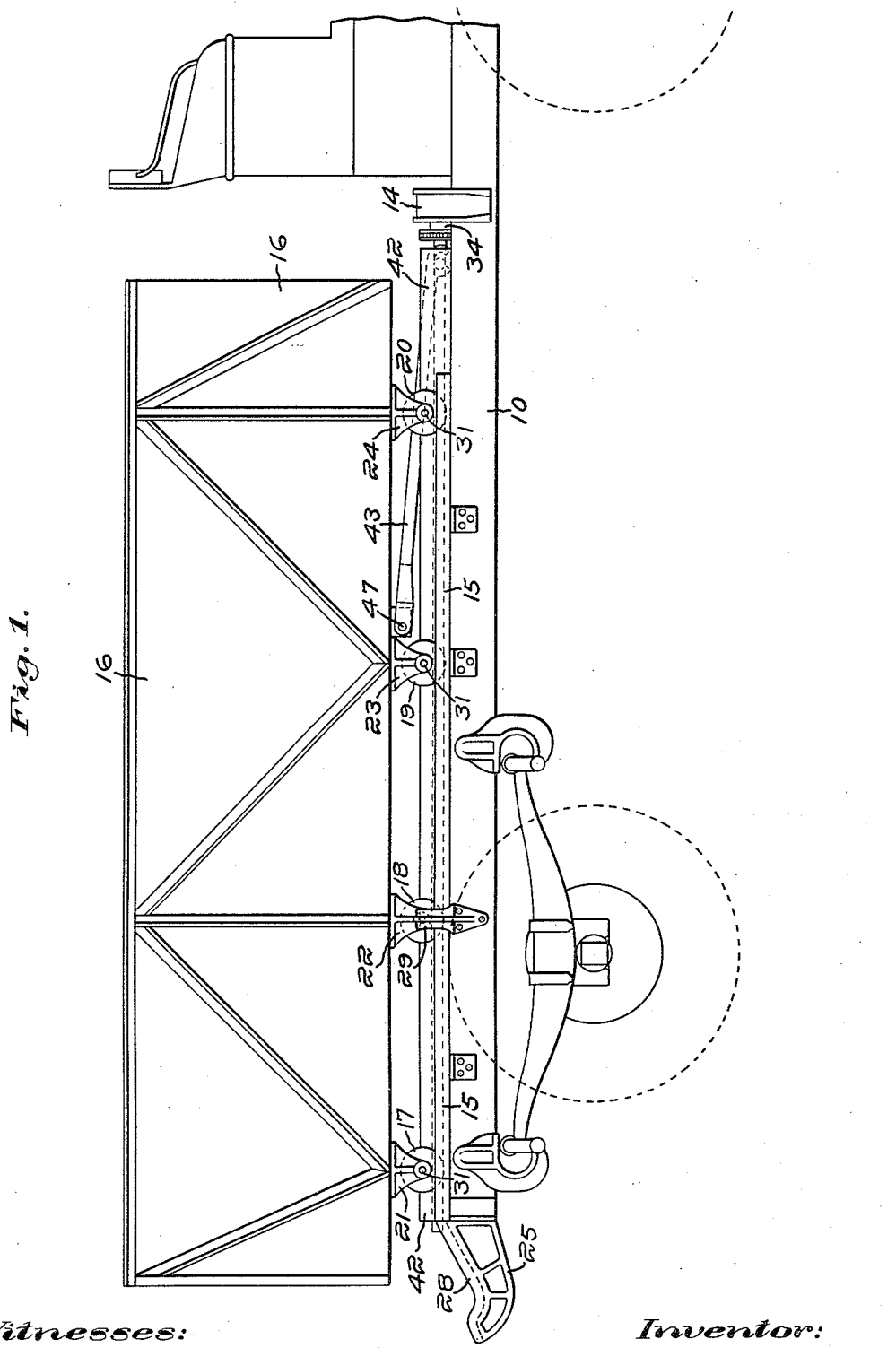

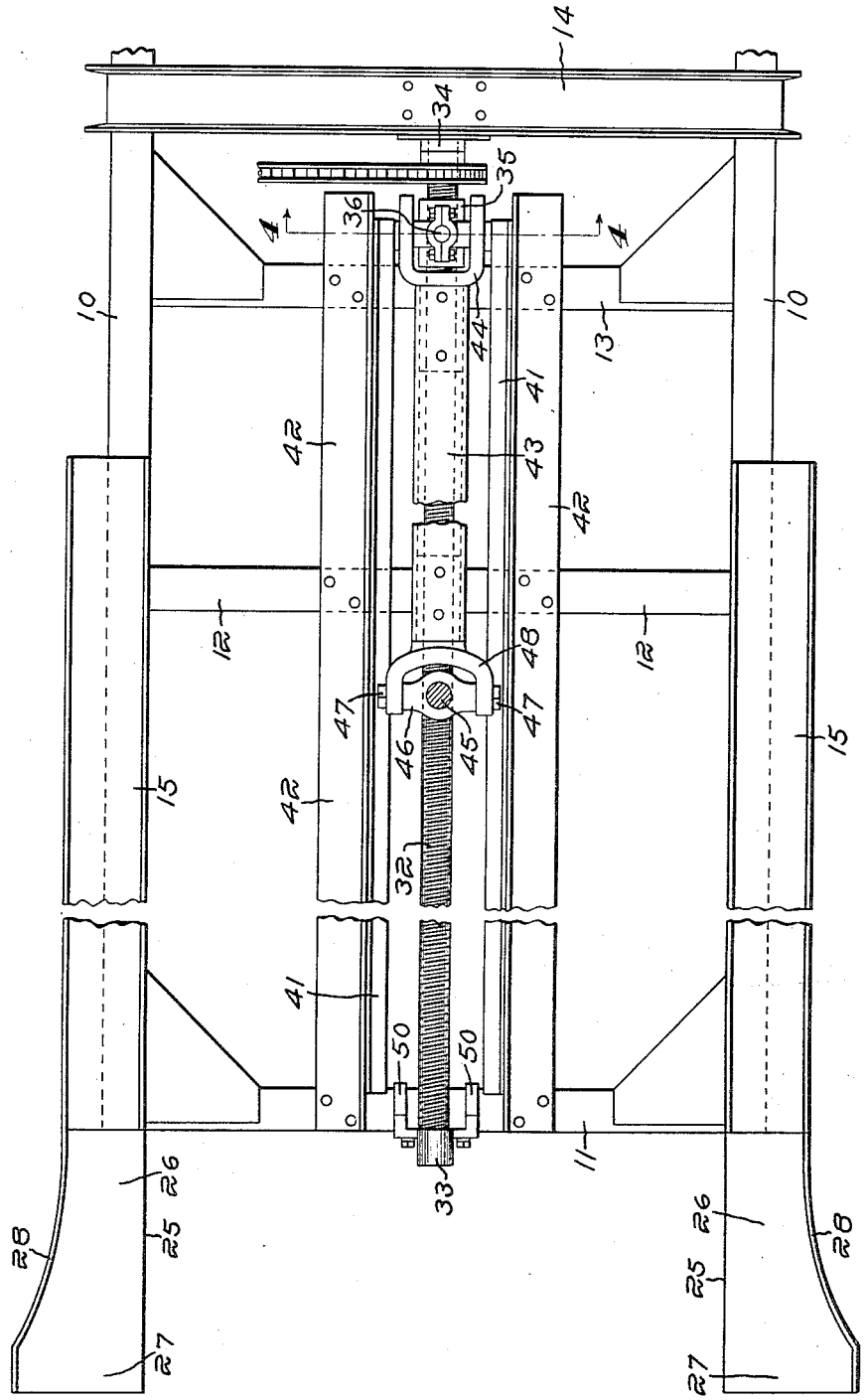

A. C. SCHULZ.
REMOVABLE BODY FOR VEHICLES.
APPLICATION FILED DEC. 27, 1913.
1,243,636.
Patented Oct. 16, 1917.
4 SHEETS—SHEET 3.
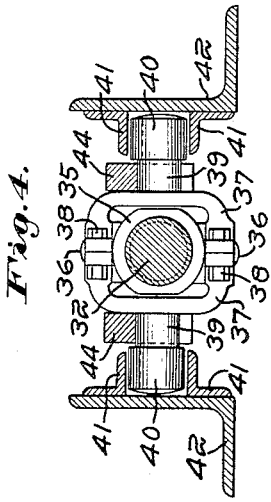
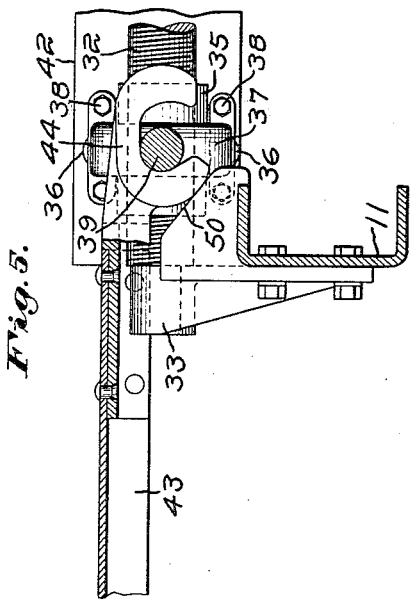
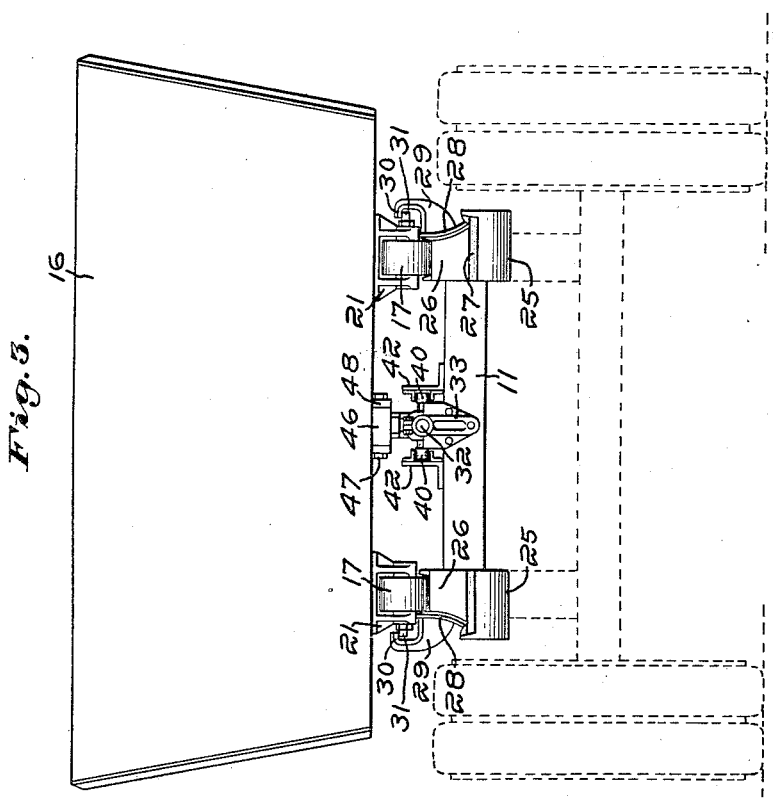
Witnesses:
Carl L. Choate.
Horace A. Croseman
Inventor:
Albert C. Schulz,
by Emery, Booth, Janney & Varney
Attys.

A. C. SCHULZ.
REMOVABLE BODY FOR VEHICLES.
APPLICATION FILED DEC. 27, 1913.

1,243,636.  Patented Oct. 16, 1917.
4 SHEETS—SHEET 4.

Witnesses:
Carl L. Choate.
Horace A. Crossman

Inventor:
Albert C. Schulz,
by Emery, Booth, Janney & Varney
Attys.

though belatedly into alinement with the frame.

UNITED STATES PATENT OFFICE.

ALBERT C. SCHULZ, OF BRIDGEPORT, CONNECTICUT, ASSIGNOR TO THE LOCOMOBILE COMPANY OF AMERICA, OF NEW YORK, N. Y., A CORPORATION OF WEST VIRGINIA.

REMOVABLE BODY FOR VEHICLES.

1,243,636.     Specification of Letters Patent.     Patented Oct. 16, 1917.

Original application filed November 25, 1912, Serial No. 733,273. Divided and this application filed December 27, 1913. Serial No. 809,114.

*To all whom it may concern:*

Be it known that I, ALBERT C. SCHULZ, a citizen of the United States, and a resident of Bridgeport, county of Fairfield, and State of Connecticut, have invented an Improvement in Removable Bodies for Vehicles, of which the following description, in connection with the accompanying drawings, is a specification, like characters on the drawings representing like parts.

This invention relates to removable bodies for vehicles, and more especially to a body intended to be removed from a truck onto an adjacent platform and replaced by the same, or a similar, body through the use of mechanism carried by the truck. This application is a division of my prior pending application, filed Nov. 25, 1912, Serial No. 733,273.

My invention will be best understood by reference to the following specification, when taken in connection with the accompanying drawings of one specific embodiment thereof, while its scope will be more particularly pointed out in the appended claims.

In the drawings:

Figure 1 is a side elevation of a truck having a body embodying my invention;

Fig. 2 is a partial plan of the truck with the body removed;

Fig. 3 is a rear elevation of the truck and its body, the running gear of the truck being indicated in dotted lines;

Fig. 4 is a detail sectional view, on an enlarged scale, on line 4—4 of Fig. 2;

Fig. 5 is an enlarged longitudinal, sectional view, also on an enlarged scale, illustrating the link or draw-bar hook about to disengage from the trunnions of the feed-nut.

Figure 6:
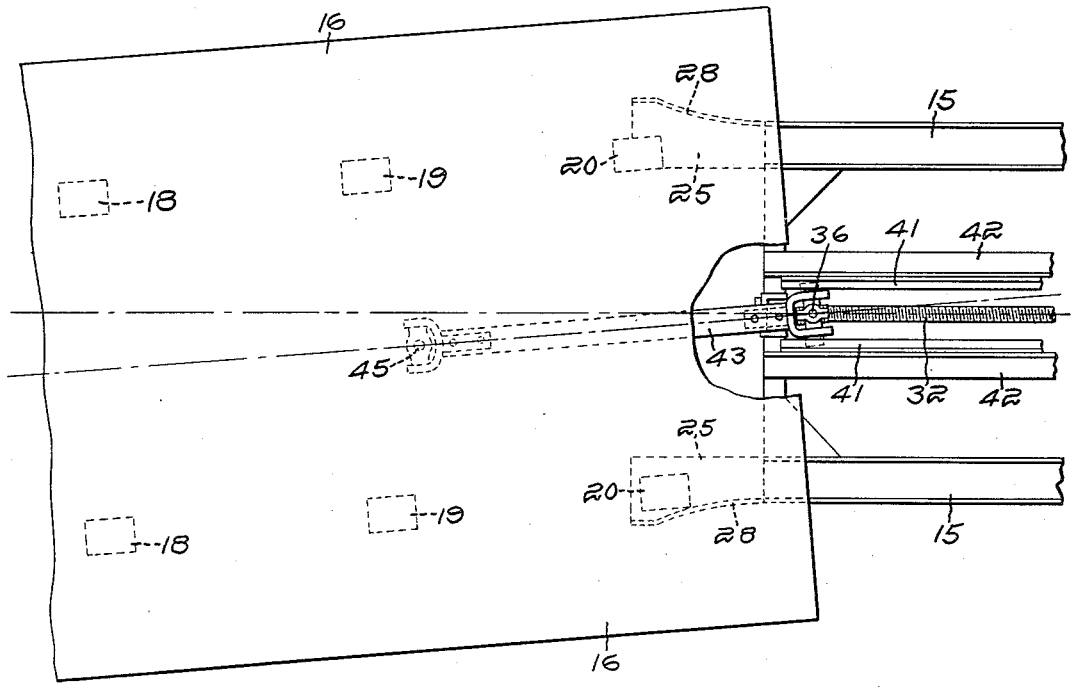
Figs. 6 and 7 are, respectively, a plan and elevation, the latter being partly in longitudinal section, illustrating the action of the link or draw-bar, as the body is being pulled onto or pushed off the truck chassis.

Referring to the drawings, and to the embodiment of my invention which I have selected for illustrative purposes, I have there shown a truck having a frame, herein comprising a pair of side members 10—10, tied together by cross members 11, 12, 13 and 14. This frame supports a guideway to sustain the body, said guideway being herein in the form of a track comprising two rails 15—15, which may be in the form of channel members having upturned flanges forming guides for the body wheels, or other substituted or equivalent parts carried by the body.

Mounted in any suitable manner upon this track is a body 16, which is provided with suitable means to travel along the guideways, such means in the present instance comprising a plurality of pairs of wheels 17—17, 18—18, 19—19, and 20—20, journaled in suitable bearing brackets 21—21, 22—22, 23—23, and 24—24, secured to the body. These wheels are arranged to travel upon the channel rails 15—15, and are guided by the upturned flanges of the latter. A pair of supporting arms 25—25 secured to the frame constitute in effect continuations of the rails 15—15 of the guideway. These arms may be, and preferably are, provided with downwardly inclined portions 26—26, and may be further provided with downwardly and rearwardly inwardly inclined portions 27—27, the purpose of which will presently appear.

When the body is resting upon an adjacent elevated support, such as a loading and unloading platform, and it becomes necessary to draw the body onto the truck chassis as hereinafter described, it is practically impossible relatively to position the body and chassis in exact alinement. It therefore becomes necessary to provide a body-moving mechanism including means having provision permitting relative misalinement of the body and chassis frame, while the body is on the unloading platform, and means to cause the body automatically to aline with the frame, when it is drawn onto the latter. As a means for bringing the body and frame into alinement, I may provide any suitable means, but herein I have provided the arms or brackets 25 with rearwardly diverging upturned flanges 28—28, which will serve as guides for the body wheels, and when the body is being replaced upon the truck frame, if there is any misalinement between the body and truck frame, the flanges on the one side or the other will serve to guide the wheels, and by their coöperative action therewith bring the body into alinement with the frame, so that the wheels will roll into their proper places upon the rails.

As a means for preventing the body wheels from being lifted off the rails 15—15, there may be provided suitable means on the frame engaging with a part carried by the body, as for example a pair of brackets 29—29, secured to the side members 10—10, and having inwardly projecting lugs or flanges 30—30, beneath which are located pins 31—31 carried by the brackets 22—22, respectively. Preferably, the lugs or flanges 30—30 are inclined downwardly toward the front of the vehicle, so that when the body is brought forward into its normal position, the downward inclination of the flanges will act through the pins 31 to cause the wheels to be drawn down firmly against their rails, thus fixedly holding the body in its normal position. Any suitable mechanism may be provided for moving the body along its guideways to remove it from the truck frame, and replace it thereon at will. In the present instance, I have selected for illustration a mechanism comprising a feed-screw 32 journaled in suitable bearings 33 and 34 on the cross members 11 and 14, respectively.

Coöperating with this feed-screw is a feed-nut 35, which may be and preferably is provided with vertical trunnions 36—36, mounted in a yoke formed in two parts 37—37 secured together about the trunnions 36 by bolts 38.

As a means for preventing the nut from rotating about its axis, the yoke is herein provided with laterally projecting trunnions 39—39, on which are journaled rollers 40—40, arranged to travel each in a pair of guides 41—41, herein formed by pairs of angle-irons secured to angle irons 42—42, the latter being mounted upon the cross frame members 11, 12 and 13 of the frame. By this means, the nut is held against rotation, and the rotation of the screw is utilized to move the nut longitudinally for the purpose which will presently appear. The nut 35 may be connected to the body 16 by any suitable means, but herein there is provided a link or draw-bar 43, forked at its forward end to provide a pair of hooks 44 normally straddling the feed nut, and engaging the trunnions 39 respectively. This provides a driving connection which may be readily disconnected at will when it is desired to remove the body from the frame of the truck.

The rear end of the link or draw-bar 43 is connected to the body, preferably by a universal connection, herein comprising a stud 45, secured to the body and having pivoted thereon a block 46, provided with trunnions in the form of studs 47—47, pivoted in a fork 48 formed on or appropriately secured to the rear end of the link or draw-bar. By the described connections, the link or draw-bar 43 is universally connected to the body, as well as to the feed nut, thus permitting relative misalinement of the body and chassis frame when the body is moved off the frame onto the platform, or from the platform onto the frame. It will thus be seen that, upon remounting the body on the truck frame, the body and frame may be out of line, and the link can still be engaged with the trunnions of the feed nut.

It will now be evident that by rotating the feed screw in the proper direction, it will act through the feed nut and link or draw-bar to move the body rearwardly or forwardly along the frame. It will also be evident that, when the feed screw is not rotated, the described connections will serve as a means for locking the body against longitudinal movement with relation to the frame. The feed screw may be rotated in one direction or the other by any appropriate mechanism, which it will be unnecessary herein to describe.

In order that a truck may be kept in use as continuously as possible, with the minimum amount of time for loading and unloading, it is desirable to provide more than one body for a given truck, so that when the truck is hauling a load in one body from one point to another, a second body may be loaded with materials and substituted for the first body, in a few moments after the truck has returned with the previously unloaded body. By the use of the described mechanism, this may be accomplished very quickly and conveniently.

When it is desired to remove the body, the truck is backed up to an unloading platform of suitable height, exemplified by the platform 49. The operator then causes the feed screw to be rotated in the proper direction to cause the body to be moved rearwardly along the truck frame and delivered upon the unloading platform 49, the first pair of wheels resting upon the platform, and then the remaining wheels in succession passing from the truck frame onto the platform in an obvious manner. When this has taken place, the hook 44 of the link 43 may be either manually or automatically disengaged from the trunnions 39.

As a means for automatically disengaging the hook from the trunnions, I have herein provided a species of cam, or cams, provided with a pair of inclined surfaces 50, which are capable of utilizing the rearward movement of the nut or hook to lift the latter and free it from the trunnions in an obvious manner, the opening in the hook being preferably somewhat elongated for the purpose of facilitating its disengagement from the trunnions.

Figure 7:
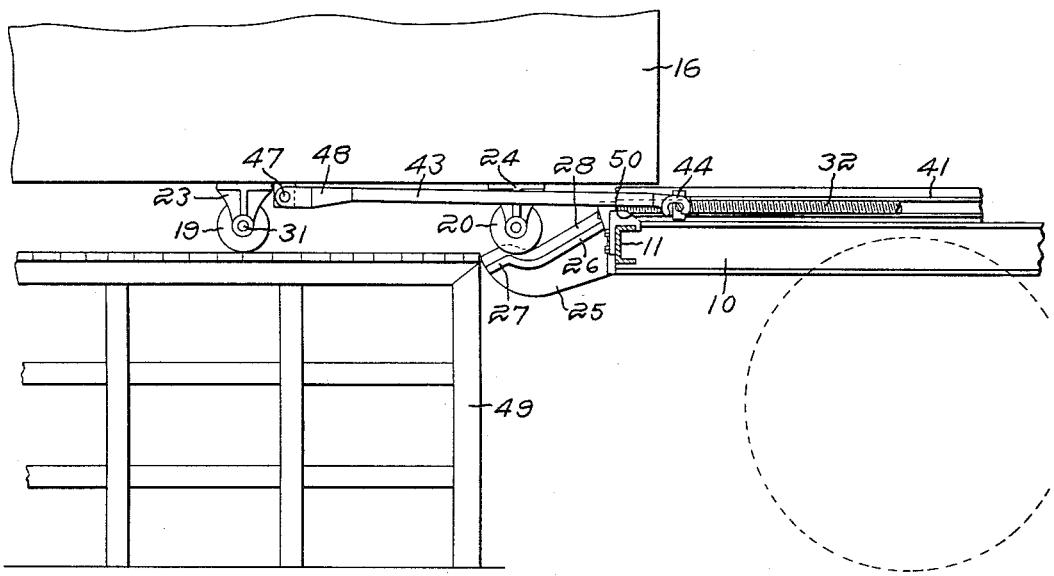

Now, assuming that it is desired to replace the body, or place another body upon the truck, the selected body is first brought into position upon the loading and unloading platform as nearly as practicable in line with the truck, and the hook 44 of the link 43 is hooked onto the trunnions 39, the feed nut for that purpose being advanced slightly along the feed screw. By reference to Figs. 6 and 7, it will be evident that, owing to the universal connections for the ends of the link, the latter may be swung horizontally as well as vertically, thus taking care of any possible misalinement, or difference in level, between the body and the chassis. When the hook has been properly engaged, the feed screw is then rotated in the proper direction to cause the nut to be advanced toward the front of the truck, thereby to draw the body from the platform onto the frame of the chassis. In so doing, the wheels will engage the upwardly inclined surfaces of the guideways, and if the body is out of line with the chassis, the wheels will coöperate with the laterally diverging guide flanges 28, thereby to utilize the forward movement of the body to bring the latter into proper alinement with the frame. It will be evident that, as the loaded body advances along the truck frame, the latter will gradually sink upon its springs, and will approach the level of the loading and unloading platform. When the body has reached its proper position upon the frame, the rotation of the feed screw is stopped, and the body comes to a state of rest upon its guideway, being positively locked in such position by the feed screw, the feed nut, and described parts connecting the feed nut to the body.

While I have herein shown and described one specific embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described one embodiment of my invention what I claim and desire by Letters Patent to procure is:

1. An apparatus of the class described comprising, in combination, a body, a feed-screw, a feed-nut coöperating with said feed-screw, a link connected to said body and said feed-nut, and means consequent upon movement of said body automatically to disconnect said link from said feed-nut.

2. An apparatus of the class described comprising, in combination, a body, a feed-screw, a feed-nut coöperating with said feed-screw, and a link connected to said body and provided with a hook attached to said feed-nut.

3. An apparatus of the class described comprising, in combination, a body, a feed-screw, a feed-nut coöperating with said feed-screw, and a link connected to said body and extending beyond the same and provided with a hook attached to said feed-nut.

4. An apparatus of the class described comprising, in combination, a body, a feed-screw, a feed-nut coöperating with said feed-screw, and a link connected to said body and provided with a forked hook attached to and straddling said feed-nut.

5. An apparatus of the class described comprising, in combination, a body, a feed-screw, a feed-nut coöperating with said feed-screw, a link connected to said body and provided with a hook connected to said feed-nut, and means to unhook said hook from said feed-nut.

6. An apparatus of the class described comprising, in combination, a body, a feed-screw, a feed-nut coöperating with said feed-screw, a link connected to said body and provided with a hook connected to said feed-nut, and a wedge arranged to disengage said hook from said feed-nut.

7. An apparatus of the class described comprising, in combination, a guideway, a body supported on said guideway, means to remove said body longitudinally entirely off said guideway including a link extending in general direction longitudinally of said guideway, and means connected to said link permitting relative misalinement of said body and guideway when said body is off said guideway but in connection with said link.

8. An apparatus of the class described, comprising in combination, a body, a feed-screw, a feed-nut coöperating with said feed-screw, trunnions projecting from opposite sides of said feed-nut, rollers journaled on said trunnions, guides for said rollers extending longitudinally of said feed-screw, and a link connected to said body and having a forked hook engaging said trunnions.

9. An apparatus of the class described, comprising in combination, a body, a feed-screw, a feed-nut coöperating with said feed-screw, trunnions projecting from opposite sides of said feed-nut, guides extending longitudinally of said feed-screw and coöperating with said trunnions to prevent the rotation of said nut and a link connected to said body and having a forked hook engaging said trunnions.

10. An apparatus of the class described, comprising in combination, a body, a feed-screw, a feed-nut coöperating with said feed-screw, guides extending longitudinally of said feed-screw and acting to prevent rotation of said nut and a link connected to the body and detachably engaged with said nut.

11. An apparatus of the class described comprising, in combination, a guideway, a body, means to move said body longitudinally of said guideway including a link having a hook and a device engaged by said hook, and means automatically to disengage said hook from said device.

12. A vehicle comprising, in combination, a generally horizontal guideway, a downwardly inclined guideway, a body, and means to move said body along said horizontal guideway and off said vehicle by way of said inclined guideway, said means including coöperating driving members one of which is longitudinally rigid, is pivoted at one end to said body to swing in horizontal and vertical planes, extends in a generally horizontal direction, and is provided at its other end with a readily attachable and detachable connection having provision to swing in horizontal and vertical planes with relation to the other member.

13. A vehicle comprising, in combination, a guideway, a body mounted on said guideway, means to move said body along said guideway and off said guideway, said means including coöperating driving members, and means apart from said driving members and consequent upon movement of said body automatically to disconnect said driving members from each other.

In testimony whereof, I have signed my name to this specification, in the presence of two subscribing witnesses.

ALBERT C. SCHULZ.

Witnesses:
JOHN R. STINE,
O. SANDBERG.